(12) United States Patent
Kuppan et al.

(10) Patent No.: US 12,172,908 B2
(45) Date of Patent: Dec. 24, 2024

(54) WATER DEIONIZATION CELLS WITH FLOW CHANNELS PACKED WITH INTERCALATION MATERIAL

(71) Applicant: Robert Bosch GmbH, Stuttgart (DE)

(72) Inventors: Saravanan Kuppan, San Jose, CA (US); Münir M. Besli, San Jose, CA (US); Sondra Hellstrom, East Palo Alto, CA (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 17/400,967

(22) Filed: Aug. 12, 2021

(65) Prior Publication Data
US 2023/0050274 A1   Feb. 16, 2023

(51) Int. Cl.
*C02F 1/42*       (2023.01)
*B01D 61/50*      (2006.01)
(Continued)

(52) U.S. Cl.
CPC .............. *C02F 1/42* (2013.01); *B01D 61/50* (2013.01); *C02F 1/4604* (2013.01);
(Continued)

(58) Field of Classification Search
CPC ........ C02F 1/42; C02F 1/4691; C02F 1/4695; C02F 1/46114; C02F 1/4693;
(Continued)

(56) References Cited

U.S. PATENT DOCUMENTS 6,274,020 B1   8/2001  Schmidt et al.
7,833,400 B2   11/2010 Andelman et al.
(Continued)

FOREIGN PATENT DOCUMENTS

KR      100442773 B1    8/2004
KR      20190063067 A   6/2019

OTHER PUBLICATIONS

Chen et al. "Selective removal of cesium ions from wastewater using copper hexacyanoferrate nanofilms in an electrochemical system" Electrochimica Acta 87 (2013) 119-125 (Year: 2013).*
(Continued)

*Primary Examiner* — Alexander W Keeling
*Assistant Examiner* — Alexander R. Parent
(74) *Attorney, Agent, or Firm* — Brooks Kushman P.C.

(57) ABSTRACT

A device for removing ions from a solution. The device includes first and second flow channels between an anion exchange membrane and first and second flow plates, respectively. The first flow channel has a first land volume positioned between the first land regions and the anion exchange membrane. The first flow channel has a first channel volume positioned between the anion exchange membrane and the first channel regions and spaced apart from the anion exchange membrane. The second flow channel has a second land volume positioned between the second land regions and the anion exchange membrane. The second flow channel has a second channel volume positioned between the anion exchange membrane and the second channel regions and spaced apart from the anion exchange membrane. The device also includes an intercalation material positioned within the first land and channel volumes or the second land and channel volumes.

13 Claims, 8 Drawing Sheets

(51) Int. Cl.
*C02F 1/46* (2023.01)
*C02F 1/461* (2023.01)
*C02F 1/469* (2023.01)
*C02F 103/08* (2006.01)

(52) U.S. Cl.
CPC ...... *C02F 1/46109* (2013.01); *C02F 1/46114* (2013.01); *C02F 1/469* (2013.01); *C02F 1/4695* (2013.01); *C02F 2001/422* (2013.01); *C02F 1/4691* (2013.01); *C02F 2103/08* (2013.01); *C02F 2201/46115* (2013.01); *Y02A 20/124* (2018.01)

(58) Field of Classification Search
CPC ..... B01D 61/50; B01D 61/42; H01M 8/0258; H01M 8/1053; H01M 8/1055
See application file for complete search history.

(56) References Cited

U.S. PATENT DOCUMENTS

| | | | |
|---|---|---|---|
| 10,988,391 B2 | 4/2021 | Kim et al. | |
| 11,145,469 B2 | 10/2021 | Doyen et al. | |
| 2002/0017463 A1* | 2/2002 | Merida-Donis | H01M 16/006 204/647 |
| 2004/0253505 A1* | 12/2004 | Blunk | H01M 8/0213 429/530 |
| 2006/0275643 A1* | 12/2006 | Abd Elhamid | H01M 8/0221 429/514 |
| 2007/0272550 A1 | 11/2007 | Shiue | |
| 2008/0198531 A1 | 8/2008 | Shiue et al. | |
| 2009/0214926 A1* | 8/2009 | Watanabe | H01M 8/0239 264/105 |
| 2009/0255815 A1 | 10/2009 | Shiue et al. | |
| 2014/0093639 A1* | 4/2014 | Schlag | H01M 8/0228 429/414 |
| 2014/0346046 A1 | 11/2014 | Andelman | |
| 2017/0117557 A1* | 4/2017 | Okuno | H01M 8/0239 |
| 2018/0148355 A1* | 5/2018 | Smith | B01D 61/422 |
| 2019/0225513 A1 | 7/2019 | Paranthaman et al. | |
| 2020/0123027 A1 | 4/2020 | Kornbluth et al. | |
| 2020/0123028 A1 | 4/2020 | Kim et al. | |
| 2020/0123029 A1 | 4/2020 | Kornbluth et al. | |
| 2020/0131058 A1 | 4/2020 | Kim et al. | |
| 2020/0144627 A1* | 5/2020 | Hall | H01M 4/8885 |
| 2020/0148560 A1 | 5/2020 | Hellstrom et al. | |
| 2020/0399149 A1 | 12/2020 | Kim et al. | |
| 2021/0039970 A1 | 2/2021 | Metzger et al. | |
| 2021/0107810 A1 | 4/2021 | Wyatt et al. | |
| 2021/0198124 A1 | 7/2021 | Metzger et al. | |
| 2021/0376366 A1 | 12/2021 | Kornbluth et al. | |
| 2021/0387139 A1* | 12/2021 | Voskian | H01M 50/449 |
| 2022/0112102 A1 | 4/2022 | Kim et al. | |

OTHER PUBLICATIONS

Laxman et al. "Tailoring the pressure drop and fluid distribution of a capacitive deionization device" Desalination 449 (2019) 111-117 (Year: 2019).*

Metzger et al. "Techno-economic analysis of capacitive and intercalative water deionization" Energy Environ. Sci., 2020, 13, 1544 (Year: 2020).*

Liu, et al. "Rocking-chair capacitive deionization with flowthrough electrodes" J. Mater. Chem. A, 2020, 8, 8476 (Year: 2020).*

Li et al. "Faradaic Electrodes Open a New Era for Capacitive Deionization" Adv. Sci. 2020, 7, 2002213 (Year: 2020).*

Gao et al. "Graphene Oxide-Tuned $MoS_2$ with an Expanded Interlayer for Efficient Hybrid Capacitive Deionization" ACS Sustainable Chem. Eng. 2020, 8, 9690-9697 (Year: 2020).*

Torkamanzadeh et al. "MXene/Activated-Carbon Hybrid Capacitive Deionization for Permselective Ion Removal at Low and High Salinity" ACS Appl. Mater. Interfaces 2020, 12, 26013-26025 (Year: 2020).*

Yao et al. "Effect of Flow Configurations on the Desalination Performance of Symmetrical Desalination Battery with Intercalation Electrodes" 2022 J. Electrochem. Soc. 169 123501 (Year: 2022).*

Millichamp et al. "Mechanisms and effects of mechanical compression and dimensional change in polymer electrolyte fuel cells—A review" Journal of Power Sources 284 (2015) 305-320 (Year: 2015).*

AIP Precision Machining "Advantages of Polymer Components over Metallic Materials for Machined Parts" web Mar. 25, 2019 (Year: 2019).*

Hemmatifar, A. et al. "Energy breakdown in capacitive deionization," Water Research, vol. 104, 2016, pp. 303-311, DOI: 10.1016/j.watres.2016.08.020.

Lee, J. et al. "Rocking-Chair Capacitive Deionization for Continuous Brackish Water Desalination," ACS Sustainable Chemistry & Engineering, vol. 6, 2018, pp. 10815-10822, DOI: 10.1021/acssuschemeng.8b02123.

Porada, S. et al. "Nickel Hexacyanoferrate Electrodes for Continuous Cation Intercalation Desalination of Brackish Water," Electrochimica Acta, vol. 255, 2017, pp. 369-378, DOI: 10.1016/j.electacta.2017.09.137.

Singh, K. et al. "Water desalination with nickel hexacyanoferrate electrodes in capacitive deionization: Experiment, model and comparison with carbon," Desalination, vol. 496, No. 114647, 2020, pp. 1-9, DOI: 10.1016/j.desal.2020.114647.

Suss, M. E. et al., "Capacitive desalination with flow-through electrodes," Energy & Environmental Science, 2012, vol. 5, pp. 9511-9519, DOI: 10.1039/c2ee21498a.

Guyes, E.N. et al., "Several orders of magnitude increase in the hydraulic permeability of flow-through capacitive deionization electrodes via laser perforations," RSC Advances, vol. 7, No. 21308, 2017, pp. 21308-21313, DOI: 10.1039/c7ra00459a.

* cited by examiner

WATER DEIONIZATION CELLS WITH FLOW CHANNELS PACKED WITH INTERCALATION MATERIAL

TECHNICAL FIELD

The present disclosure relates to water deionization cells with flow channels packed with intercalation material.

BACKGROUND

The Earth's increasing population has created an ever-growing need for clean fresh water for human consumption, agricultural purposes, and industrial purposes. Fresh water refers to a water solution having a low salt concentration (e.g., less than 1%). With limitations on fresh water sources, numerous attempts have been made to produce fresh water from abundant sea and ocean waters by desalination. Desalination is a process of removing mineral components from a saline solution (e.g., a saline water). Removal of salt and other chemicals from the saline water requires electric or thermal energy to separate the saline water into two streams. The two streams are a freshwater stream containing a low concentration of dissolved salts and a second stream of concentrated brine having a high concentration of dissolved salts.

SUMMARY

According to one embodiment, a device for removing ions from a solution is disclosed. The device includes first and second flow plates. The first flow plate has first land regions and first channel regions spaced apart from the first land regions. The second flow plate has second land regions and second channel regions spaced apart from the second land regions. The device further includes an anion exchange membrane positioned between first and second flow plates to form first and second flow channels between the anion exchange membrane and first and second flow plates, respectively. The first flow channel has a first land volume positioned between the first land regions and the anion exchange membrane. The first flow channel has a first channel volume positioned between the anion exchange membrane and the first channel regions and spaced apart from the anion exchange membrane. The second flow channel has a second land volume positioned between the second land regions and the anion exchange membrane. The second flow channel has a second channel volume positioned between the anion exchange membrane and the second channel regions and spaced apart from the anion exchange membrane. The device also includes an intercalation material positioned within the first land and channel volumes or the second land and channel volumes.

According to another embodiment, a device for removing ions from a solution is disclosed. The device includes first and second flow plates. The first flow plate has first land regions and first channel regions spaced apart from the first land regions. The second flow plate has second land regions and second channel regions spaced apart from the second land regions. The device further includes an anion exchange membrane positioned between first and second flow plates to form first and second flow channels between the anion exchange membrane and first and second flow plates, respectively. The first flow channel has a first land volume positioned between the first land regions and the anion exchange membrane. The first flow channel has a first channel volume positioned between the anion exchange membrane and the first channel regions and spaced apart from the anion exchange membrane. The second flow channel has a second land volume positioned between the second land regions and the anion exchange membrane. The second flow channel has a second channel volume positioned between the anion exchange membrane and the second channel regions and spaced apart from the anion exchange membrane. The device further includes an intercalation material layer positioned within the first land and channel volumes or the second land and channel volumes.

According to yet another embodiment, a device for removing ions from a solution is disclosed. The device includes first and second flow plates. The first flow plate has first land regions and first channel regions spaced apart from the first land regions. The second flow plate has second land regions and second channel regions spaced apart from the second land regions. The device further includes an anion exchange membrane positioned between first and second flow plates to form first and second flow channels between the anion exchange membrane and first and second flow plates, respectively. The first flow channel has a first land volume positioned between the first land regions and the anion exchange membrane. The first flow channel has a first channel volume positioned between the anion exchange membrane and the first channel regions and spaced apart from the anion exchange membrane. The second flow channel has a second land volume positioned between the second land regions and the anion exchange membrane. The second flow channel has a second channel volume positioned between the anion exchange membrane and the second channel regions and spaced apart from the anion exchange membrane. The device further includes an intercalation material evenly distributed within the first land and channel volumes.

DETAILED DESCRIPTION

Figure 1:
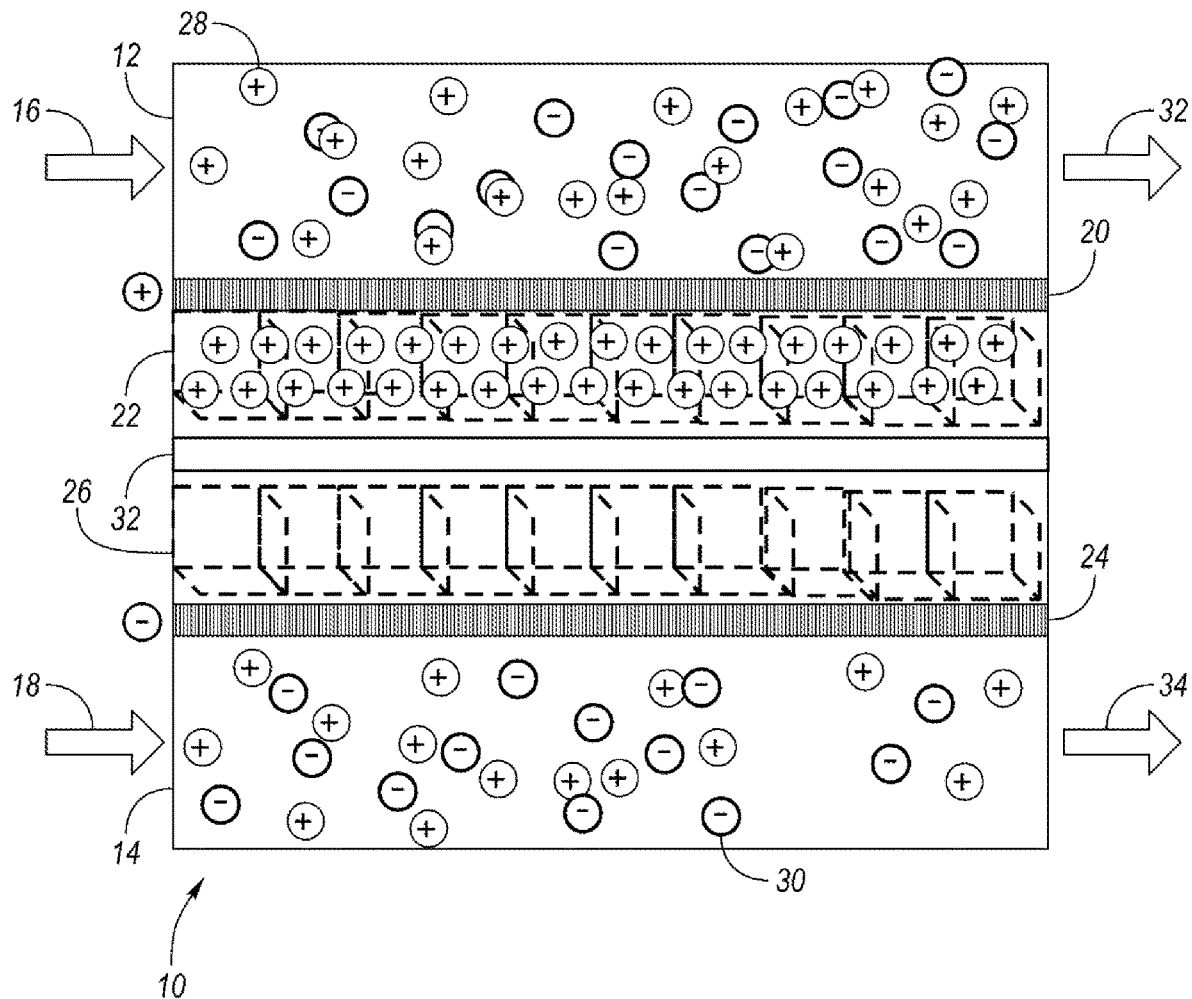
FIG. 1 is a schematic diagram of an intercalation desalination (IDI) cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e., the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of" and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Water from traditionally safe sources such as municipal water sources or potable water from wells may nonetheless possess qualities that are less desirable to the water consumer. For instance, water from potable water sources can vary significantly with respect to taste, odor, turbidity, bacterial and/or viral contamination, heavy metal contamination, hardness, mineral deposits, and/or a combination of these water quality parameters. The quality parameter of water hardness relates to the concentration of calcium ions ($Ca^{2+}$) and/or magnesium ions ($Mg^{2+}$) present in a given volume of water. Calcium and/or magnesium exist in potable water in the form of salts, which are normally soluble in the form of sulfates, carbonates, bicarbonates, or chlorides. The soluble salts are often ionized so that the water contains a relatively high concentration of calcium ions and/or magnesium ions.

Water is typically classified according to hardness as "soft water" or "hard water." The harder the water, the greater the concentration of calcium and/or magnesium ions per volume. Hard water is typically undesirable because it can cause scale buildup in plumbing, fixtures, and appliances and may affect the performance these systems and devices. For instance, the heat from a hot water heater removes some calcium carbonate and magnesium carbonate from the water, resulting in scale buildup that can slow the heating process and increase energy usage. Cleaning agents used with hard water are often less effective. Clothes washed in hard water may become dingy and gray with time and feel harsh or scratchy. Glassware may become spotted as it dries. Films may be left on shower doors or curtains, walls, and tubs, and hair washed in hard water may look dull and not feel clean. The process of removing calcium ions and/or magnesium ions from hard water is commonly referred to as water softening.

Reverse osmosis and thermal distillation are two examples of systems for removing ions from a solution. While both systems are very effective in desalinating saline solutions having high salinity, such as seawater, these systems are associated with relatively high costs and energy consumption. The concentration of dissolved salts in a saline solution having high salinity may be one of the following values or in the range of any two of the following values: 30,000; 31,000; 32,000; 33,000; 34,000; 35,000; 36,000; 37,000; 38,000; 39,000; and 40,000 parts per million. Desalination of saline solutions having lower salinity, such as brackish water, may be accomplished by using electrochemical desalination systems, such as electrodialysis systems or capacitive deionization systems. These systems may treat a saline solution by partial removal of one or more types of ions from a saline solution stream. The concentration of dissolved salts in a saline solution having lower salinity may be one of the following values or in a range of any two of the following values: 1,500; 2,000; 3,000; 4,000; 5,000; 6,000; 7,000; 8,000; 9,000; 10,000; 11,000; 12,000; 13,000; 14,000; and 15,000 parts per million.

A more recent proposal for an electrochemical desalination system for desalinating a lower salinity solution, such as brackish water, uses a flow-through desalination battery cell configured to intercalate one or more types of ions into a host structure. This type of electrochemical desalination system may be referred to as intercalative desalination (IDI) system.

FIG. 1 is a schematic diagram of intercalation desalination (IDI) cell 10. As shown in FIG. 1, IDI cell 10 includes first and second solution compartments 12 and 14 configured to receive a stream of saline solution as represented by arrows 16 and 18, respectively. Non-limiting examples of a saline solution stream include seawater, brackish water, or hard water. First solution compartment 12 includes first current collector 20 and first intercalation electrode 22. Second solution compartment 14 includes second current collector 24 and second intercalation electrode 26.

First and second intercalation electrodes 22 and 26 form a pair of redox-active electrodes with one electrode having at or near a 0% state of charge (SOC) and the other electrode having at or near a 100% SOC. Upon applying an electrical bias (e.g., voltage or current) between first and second intercalation electrodes 22 and 26, cations 28 (e.g., a monovalent cation ($Na^+$) or a divalent cation ($Ca^{2+}$ or $Mg^{2+}$)) in one of the saline solution streams intercalate into the electrode having at or near a 0% SOC, while anions 30 pass through anion exchange membrane 32 into the other electrode where the anions 30 join with cations 28 released from the at or near 100% SOC electrode compartment to preserve charge neutrality. This process of using IDI cell 10 produces desalinated and/or softened water in one of the first and second solution compartments 12 and 14 and concentrated saline water in the other of the first and second compartments 12 and 14. The output flows are represented by arrows 32 and 34. The process may be reversed when the electrical bias is flipped such that continuous freshwater and brine streams may be generated.

Figure 2:
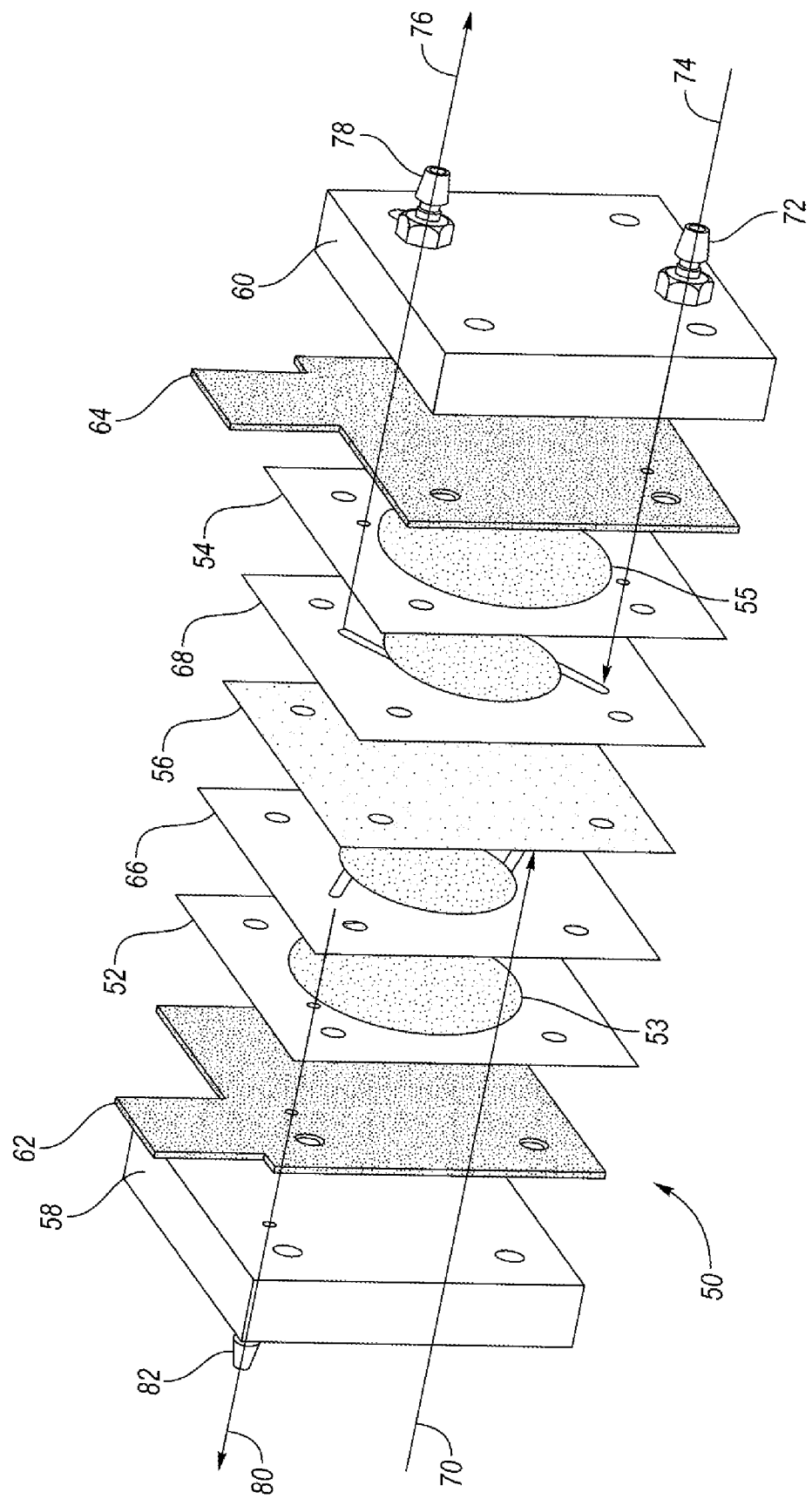
FIG. 2 is an exploded, perspective view of an DI cell having a pair of current collectors.

FIG. 2 is an exploded, perspective view of intercalation desalination (IDI) cell 50. IDI cell 50 includes first and second cation intercalation electrodes 52 and 54. First and second intercalation electrodes 52 and 54 include first and second electrode plates 53 and 55, respectively, and an electrode frame. The electrode plate is mated to the electrode frame with a gasket. First and second cation intercalation electrodes 52 and 54 are separated by anion exchange membrane 56. As shown in FIG. 2, IDI cell 50 has a symmetric design with a single intercalation electrode on each side of anion exchange membrane 56. IDI cell 50 also includes first and second end plates 58 and 60. First current collector 62 is situated between first cation intercalation electrode 52 and first end plate 58. Second current collector 64 is situated between second cation intercalation electrode 54 and second end plate 60. First separator 66 is situated between anion exchange membrane 56 and first cation intercalation electrode 52. Second separator 68 is situated between second cation intercalation electrode 54 and anion exchange membrane 56.

A first saline solution is fed into an inlet (not shown) of first end plate 58 to create a first stream, as depicted by arrow 70. A second saline solution is fed into inlet 72 of second end plate 60 to create a second stream, as depicted by arrow 74. The first and second streams may be feed water streams, such as seawater, hard water, or brackish water. One of first and second cation intercalation electrodes 52 and 54 starts at or near a 0% SOC, while the other of first and second cation intercalation electrodes 52 and 54 starts at or near a 100% SOC. Upon applying an electrical bias (e.g., voltage or current) between first and second cation intercalation electrodes 52 and 54, cations leave one of the first and second streams and intercalate into the adjacent one of the first and second cation intercalation electrodes 52 and 54, thereby creating a stream of fresh water, as depicted by arrow 76. The stream of fresh water exits IDI cell 50 through outlet 78 of second end plate 60. While this is occurring, anions (e.g., Cl⁻) migrate across anion exchange membrane 56 and pair with cations released from the other of the first and second cation intercalation electrodes 52 and 54 to create a stream of brine solution, as depicted by arrow 80. The stream of brine water exits IDI cell 50 through outlet 82 of first end plate 58. The process can be reversed during a cell discharge step.

Figure 3:
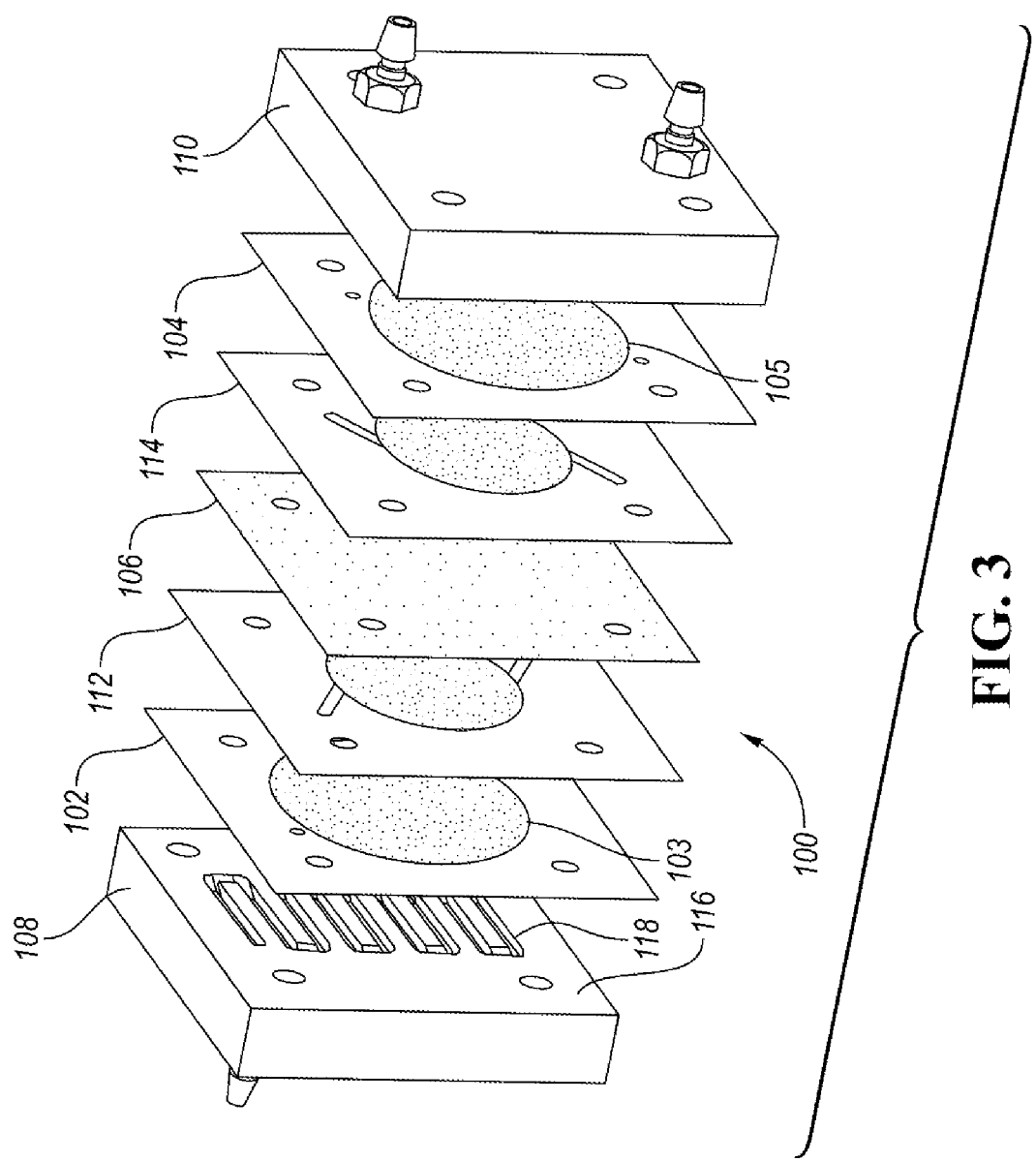
FIG. 3 is an exploded, perspective view of an IDI cell having a pair of conductive flow fields.

FIG. 3 is an exploded, perspective view of intercalation desalination (IDI) cell 100. IDI cell 100 includes first and second cation intercalation electrodes 102 and 104 separated by anion exchange membrane 106. First and second intercalation electrodes 102 and 104 include first and second electrode plates 103 and 105, respectively, and an electrode frame. The electrode plate is mated to the electrode frame with a gasket. As shown in FIG. 3, IDI cell 100 has a symmetrical design. IDI cell 100 includes first and second end plates 108 and 110. First separator 112 is situated between anion exchange membrane 106 and first cation intercalation electrode 102. Second separator 114 is situated between anion exchange membrane 106 and second cation intercalation electrode 104. End plate 108 has inner surface 116. Inner surface 116 includes conductive flow field 118 configured to distribute current and water across first cation intercalation electrode 102. Conductive flow field 118 may be formed of titanium or graphite. The inner surface of end plate 110 may have the same configuration of a conductive flow field.

Figure 4B:
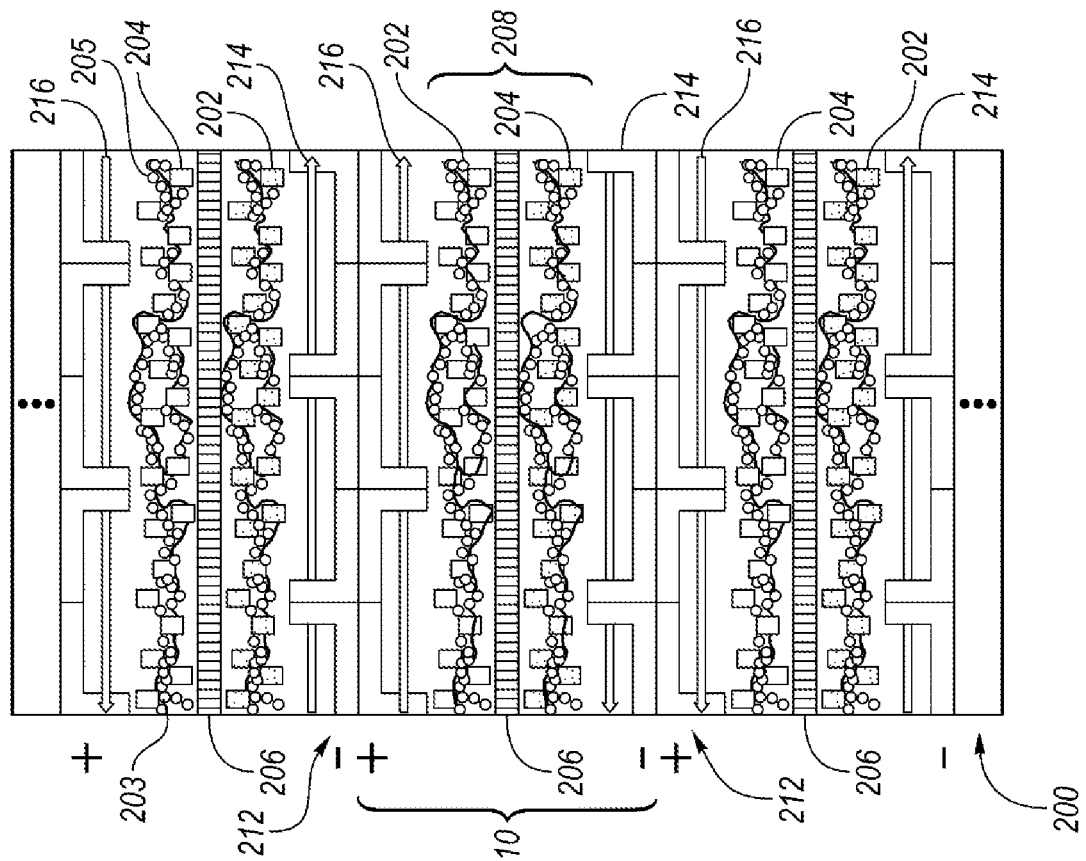
FIGS. 4A and 4B are schematic diagrams of a monopolar stack design and a bipolar stack design, respectively, of first and second DI modules, respectively.
Figure 4A:
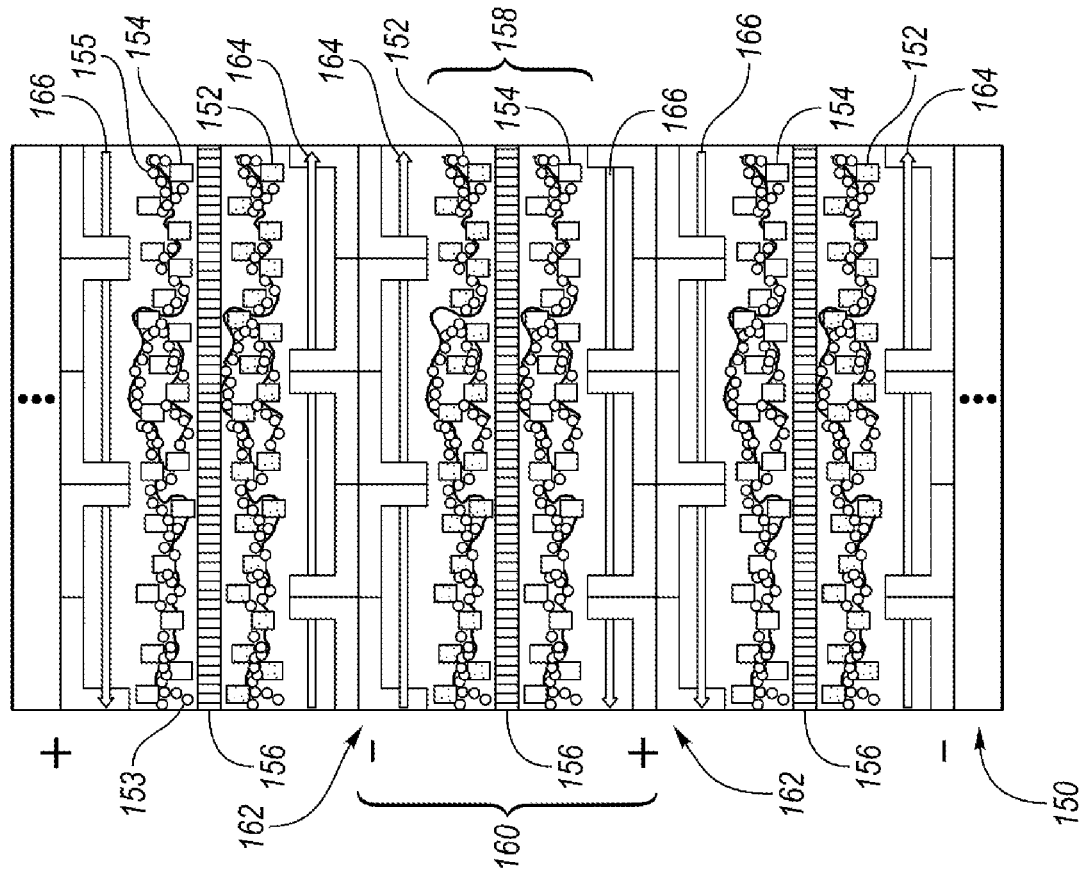

FIGS. 4A and 4B are schematic diagrams of a monopolar stack design and a bipolar stack design, respectively, of intercalation desalination (IDI) modules 150 and 200, respectively. A monopolar design of IDI module 150 is shown in FIG. 4A. IDI module 150 includes intercalation host electrodes 152 and 154 separated by anion exchange membrane 156. Intercalation host electrodes 152 and 154 may each include carbon black 153 and binder 155. Intercalation host electrodes 152 and 154 and anion exchange membrane 156 together form membrane electrode assembly (MEA) 158 within cell 160 of IDI module 150. Individual cells 160 are separated by monopolar plates (MPPs) 162 defining a flow field of clean water streams 164 and brine water streams 166. Intercalation host electrode 152 is shown in FIG. 4A as having at or near 100% SOC and intercalation host electrode 154 is shown in FIG. 4A as having at or near 0% SOC.

A bipolar design of IDI module 200 is shown in FIG. 4B. IDI module 200 includes intercalation host electrodes 202 and 204 separated by anion exchange membrane 206. Intercalation host electrodes 202 and 204 may each include carbon black 203 and binder 205. Intercalation host electrodes 202 and 204 and anion exchange membrane 206 together form membrane electrode assembly (MEA) 208 within cell 210 of IDI module 200. Individual cells 210 are separated by bipolar plates (BPPs) 212 defining a flow field of clean water streams 214 and brine water streams 216. Intercalation host electrode 202 is shown in FIG. 4B as having at or near 100% SOC and intercalation host electrode 204 is shown in FIG. 4B as having at or near 0% SOC.

Symmetric designs of IDI cells are shown in FIGS. 2, 3, 4A, and 4B where a single intercalation electrode is positioned on each side of an anion exchange membrane. In one or more embodiments, more than one intercalation electrode may be positioned on each side of an anion exchange membrane. The use of more than one intercalation electrode on each side of an anion exchange membrane may have one or more benefits. The use of multiple intercalation electrodes on one or both sides of an anion exchange membrane may reduce or eliminate the number of flow plates configured for water transport. Anion exchange membranes have Ohmic resistance due to the finite resistance in each anion exchange membrane. With a symmetrical design where a single intercalation electrode is positioned on each side of an anion exchange membrane, a relatively large number of flow plates are used to overcome the Ohmic resistance. The use of these flow plates increases the overall costs of the IDI module. In one or more embodiments, one or more of the multiple intercalation electrodes may have a porous plate. The porosity is configured to permit the movement of water between adjacent intercalation electrodes, thereby reducing or eliminating flow plates configured for water distribution. Through use of the electrode configuration and/or porous electrode plate material of one or more embodiments, the productivity (e.g., the amount of fresh water produced over unit time) of the DI module may be increased and/or the cost of the DI module may be decreased. For example, in a small-scale appliance IDI module with 1.5 Liters/min freshwater production, 65 individual cells, and a salt reduction of 500 ppm to 50 ppm, the electrode configuration and porous electrode plate material of one or more embodiments may reduce costs by a factor of about 40.

Figure 5:
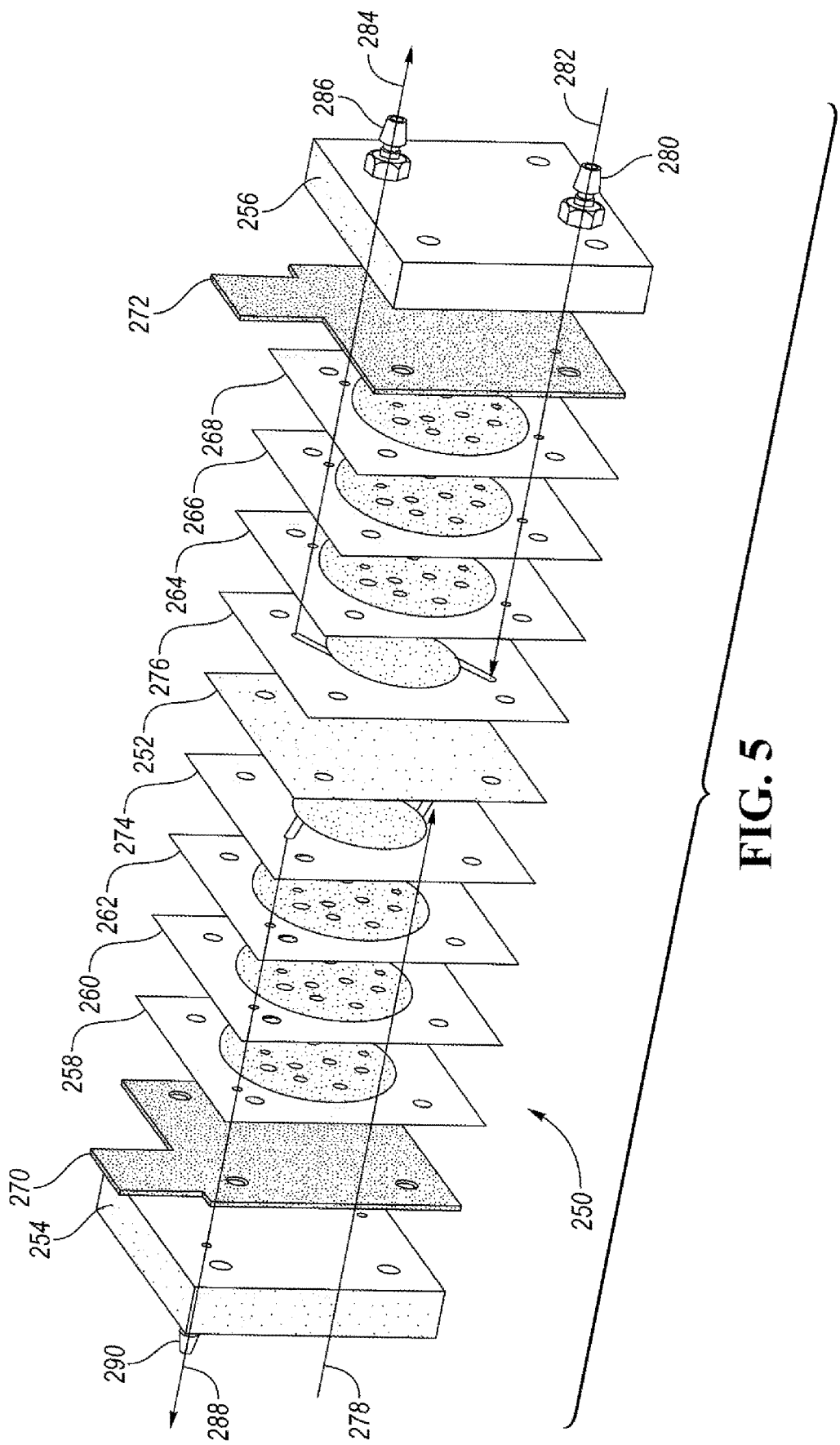
FIG. 5 is an exploded, perspective view of an IDI cell having multiple cation intercalation electrodes on each side of an anion exchange membrane.

FIG. 5 is an exploded, perspective view of IDI cell 250. Multiple IDI cells 250 may be stacked to form an DI module. IDI cell 250 includes anion exchange membrane 252 and first and second end plates 254 and 256. First, second, and third cation intercalation electrodes 258, 260, and 262 are positioned between anion exchange membrane 252 and first end plate 254. First, second, and third cation intercalation electrodes 258, 260, and 262 may be referred to as a first multiple of cation intercalation electrodes. Fourth, fifth, and sixth cation intercalation electrodes 264, 266, and 268 are positioned between anion exchange membrane 252 and second end plate 256. Fourth, fifth, and sixth cation intercalation electrodes 264, 266, and 268 may be referred to as a second multiple of cation intercalation electrodes. In one or more embodiments, a multiple may refer to two or more intercalation electrodes. In certain embodiments, the number of cation intercalation electrodes in a multiple may be any of the following values or in a range of any two of the following values: 2, 3, 4, 5, 6, 7, 8, 9, 10, 11, 12, 13, 14, 15, 16, 17, 18, 19, and 20. Each of the electrodes includes an electrode plate and an electrode frame. The electrode plate is mated to the electrode frame with a gasket.

First current collector 270 is positioned between first cation intercalation electrode 258 and first end plate 254. Second current collector 272 is positioned between sixth cation intercalation electrode 268 and second end plate 256. First separator 274 is positioned between third cation intercalation electrode 262 and anion exchange membrane 252. Second separator 276 is positioned between fourth intercalation electrode 264 and anion exchange membrane 252.

A first saline solution is fed into an inlet (not shown) of first end plate 254 to create a first stream, as depicted by arrow 278. A second saline solution is fed into inlet 280 of second end plate 256 to create a second stream, as depicted by arrow 282. The first and second streams may be feed water streams, such as seawater, hard water, or brackish water. One of the first and second cation intercalation electrode multiples includes one or more electrodes that start at or near a 0% SOC (e.g., all electrodes start at or near a 0% SOC), while the other multiple has one includes one or more electrodes that start at or near a 100% SOC (e.g., all electrodes in the multiple start at or near a 100% SOC). Upon applying an electrical bias (e.g., voltage or current) between the first and second electrode multiples, cations leave one of the first and second streams and intercalate into the adjacent one of the first and second electrode multiples, thereby creating a stream of fresh water, as depicted by arrow 284. The stream of fresh water exits IDI cell 250 through outlet 286 of second end plate 256. While this is occurring, anions (e.g., Cl$^-$) migrate across anion exchange membrane 252 and pair with cations released from the other of the first and second electrode multiples to create a stream of brine solution, as depicted by arrow 288. The stream of brine water exits IDI cell 250 through outlet 290 of first end plate 254. The process can be reversed during a cell discharge step.

As shown in FIG. 5, IDI cell 250 does not include flow plates. For instance, flow plates are not included on the inner surface of either first or second end plate 254 or 256. In one or more embodiments, the use of electrode multiples on either or both sides of the anion exchange membrane where one or more of the electrodes in each electrode multiple includes a porous component that reduces or eliminates the use of flow plates for water circulation and transport.

Figure 6:
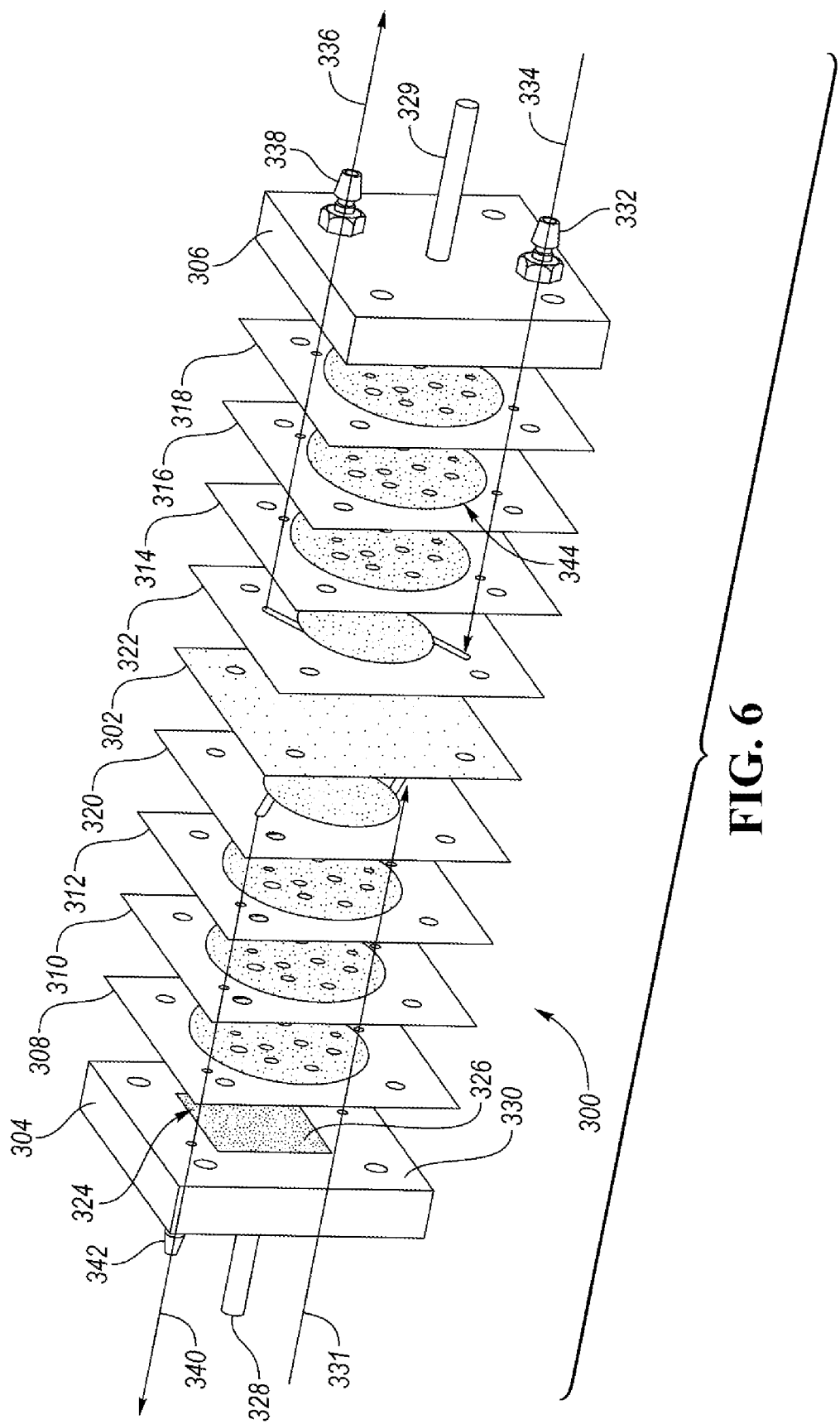
FIG. 6 is an exploded, perspective view of an IDI cell having multiple cation intercalation electrodes on each side of an anion exchange membrane and first and second current collectors formed in first and second end plates, respectively.

FIG. 6 is an exploded, perspective view of IDI cell 300. Multiple IDI cells 300 may be stacked to form an IDI module. IDI cell 300 includes anion exchange membrane 302 and first and second end plates 304 and 306. First, second, and third cation intercalation electrodes 308, 310, and 312 are positioned between anion exchange membrane 302 and first end plate 304. First, second, and third cation intercalation electrodes 308, 310, and 312 may be referred to as a first multiple of cation intercalation electrodes. Fourth, fifth, and sixth cation intercalation electrodes 314, 316, and 318 are positioned between anion exchange membrane 302 and second end plate 306. Fourth, fifth, and sixth cation intercalation electrodes 314, 316, and 318 may be referred to as a second multiple of cation intercalation electrodes. First separator 320 is positioned between third cation intercalation electrode 312 and anion exchange membrane 302. Second separator 322 is positioned between fourth intercalation electrode 314 and anion exchange membrane 302.

As shown in FIG. 6, first current collector 324 is formed in first end plate 304 and second current collector 329 is formed in second end plate 306. First current collector 324 has planar portion 326 and extending portion 328 extending from and connected to planar portion 326.

In one or more embodiments, extending portion 328 extends orthogonally from planar portion 326. First end plate 304 includes inner surface 330 having a recess for partially or entirely containing planar portion 326. First end plate 304 also includes a through aperture for receiving a portion of extending portion 328 and permitting it to extend beyond first end plate 304. In one or more embodiments, second current collector 329 has the same structure as first current collector 324. First and second current collectors 324 and 329 are configured to provide electrical conduction between a multiple of electrodes and an external circuit.

A first saline solution is fed into an inlet (not shown) of first end plate 304 to create a first stream, as depicted by arrow 331. A second saline solution is fed into inlet 332 of second end plate 306 to create a second stream, as depicted by arrow 334. The first and second streams may be feed water streams, such as seawater, hard water, or brackish water. One of the first and second cation intercalation electrode multiples includes one or more electrodes that start at or near a 0% SOC (e.g., all electrodes start at or near a 0% SOC), while the other multiple has one includes one or more electrodes that start at or near a 100% SOC (e.g., all electrodes in the multiple start at or near a 100% SOC). Upon applying an electrical bias (e.g., voltage or current) between the first and second electrode multiples, cations leave one of the first and second streams and intercalate into the adjacent one of the first and second electrode multiples, thereby creating a stream of fresh water, as depicted by arrow 336. The stream of fresh water exits IDI cell 300 through outlet 338 of second end plate 306. While this is occurring, anions (e.g., Cl$^-$) migrate across anion exchange membrane 302 and pair with cations released from the other of the first and second electrode multiples to create a stream of brine solution, as depicted by arrow 340. The stream of brine water exits IDI cell 300 through outlet 342 of first end plate 304. The process can be reversed during a cell discharge step.

As shown in FIG. 6, IDI cell 300 does not include flow plates. For instance, flow plates are not included on the inner surface of either first or second end plate 304 or 306. In one or more embodiments, the use of electrode multiples on either or both sides of the anion exchange membrane where one or more of the electrodes in each electrode multiple includes a porous component that reduces or eliminates the use flow plates for water circulation and transport.

In one or more embodiments, one or more of the current collectors shown in FIGS. 5 and/or 6 may be formed of a porous material. The porous material may be plastic foam, carbon foam, metal foam, polymeric foam, or a combination thereof. The metal foam material may be corrosion resistant. The porous material may include one or more conductive additives. The porous material of the current collector may be at least partially coated on one or both sides with an intercalation host material, for example. The coating material may be a carbon material, a metal oxide, a binary metal oxide, a ternary metal oxide, a metal nitride, a metal carbide, or a combination thereof. The thickness of the coating may be any of the following values or in a range of two of the following values: 10, 20, 30, 40, 50, 60, 70, 80, 90, and 100 nanometers. The porosity of the porous current collector material may be any of the following values or in a range of any two of the following values: 10%, 15%, 20%, 25%, 30%, 35%, 40%, 45%, and 50%. In addition to its naturally occurring porosity, the porous current collector material may further include apertures to increase the natural porosity of the porous current collector material. The apertures may extend through the entire thickness of the porous current collector material. The nominal diameter of the apertures may be any of the following values or in a range of any two of the following values: 2, 2.5, 3, 3.5, 4, 4.5, 5, 5.5, 6, 6.5, 7, 7.5, and 8 millimeters. The use of the porous current collector material may reduce or eliminate the use of flow channels or plates configured for water distribution within the IDI cell because the porous current collector material provides the water distribution function.

Figures 7A, 7B, 7C:
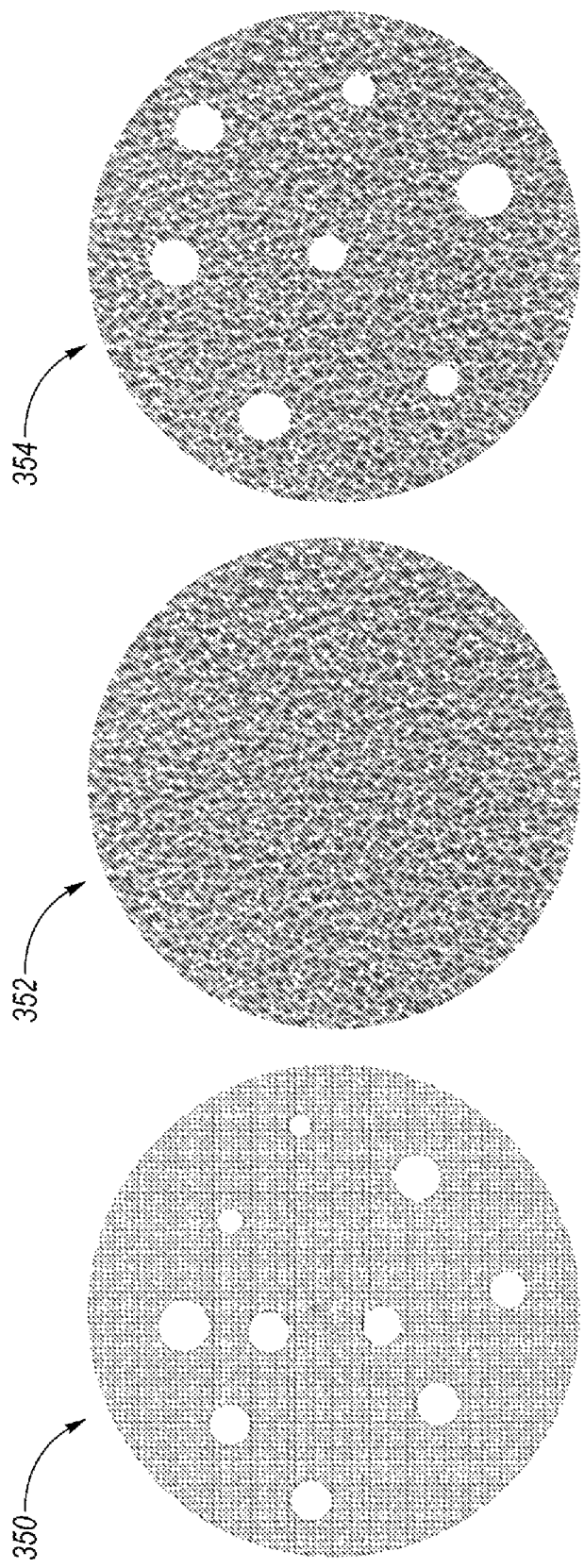
FIGS. 7A, 7B, and 7C depict examples of porous electrode materials configured for use in a cation intercalation electrode.

FIGS. 7A, 7B, and 7C depict examples of flow plates 350, 352, and 354 configured for use in an intercalation electrode, such as one or more of the intercalation electrodes shown in FIGS. 5 and 6. Flow plate 350 is a porous electrode material coated on one or both sides and having apertures. Flow plate 352 is a porous electrode material without apertures. Flow plate 354 is a porous electrode material having apertures.

For example, FIG. 6 shows porous material 344 of fifth cation intercalation electrode 316. The porous material may be plastic foam, carbon foam, metal foam, polymeric foam, or a combination thereof. The metal foam material may be corrosion resistant. The porous material may include one or more conductive additives. The porous material may be at least partially coated on one or both sides with an intercalation host material, for example. The coating material may be a carbon material, a metal oxide, a binary metal oxide, a ternary metal oxide, a metal nitride, a metal carbide, or a combination thereof. The thickness of the coating may be any of the following values or in a range of two of the following values: 10, 20, 30, 40, 50, 60, 70, 80, 90, and 100 nanometers. In addition to its naturally occurring porosity, the electrode material may further include apertures to increase the natural porosity of the porous electrode material. The apertures may extend through the entire thickness of the porous electrode material. The nominal diameter of the apertures may be any of the following values or in a range of any two of the following values: 2, 2.5, 3, 3.5, 4, 4.5, 5, 5.5, 6, 6.5, 7, 7.5, and 8 millimeters. The porosity of the porous current collector material may be any of the following values or in a range of any two of the following values: 10%, 15%, 20%, 25%, 30%, 35%, 40%, 45%, and 50%. The use of the porous electrode material may reduce or eliminate the use of flow channels or plates configured for water distribution within the IDI cell because the porous electrode material provides the water distribution function.

Figure 8:
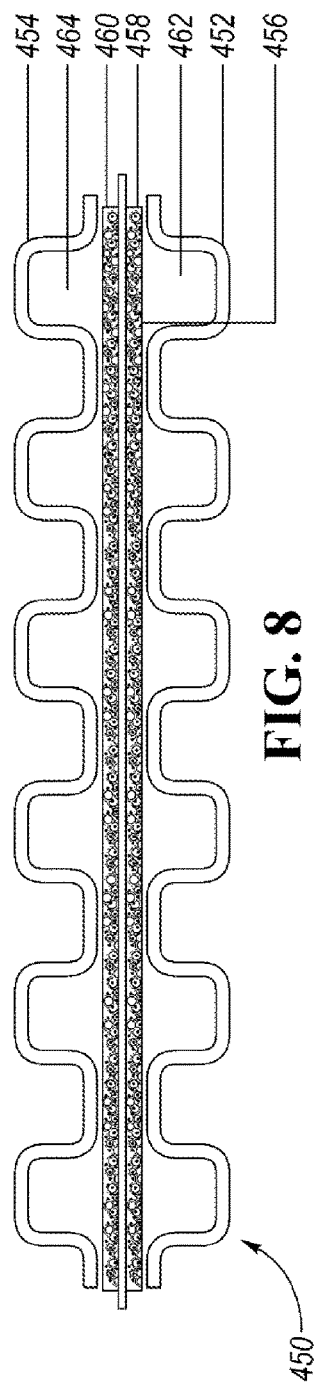
FIG. 8 is a cross section view of an IDI cell having a three-layer structure of an anion exchange membrane with intercalation electrode layers on each side.

FIG. 8 depicts a cross section view of IDI cell 450. IDI cell 450 includes first and second flow plates 452 and 454, anion exchange membrane 456, and first and second cation intercalation electrodes 458 and 460. Each of the first and second cation intercalation electrodes 458 and 460 may be comprised of a mixture of an intercalation compound, a carbon additive, and a polymeric binder.

The carbon additive is configured to provide electrical conductivity. The weight percent of the intercalation compound in the intercalation electrode may be any of the following values or in a range of any two of the following values: 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90 weight percent. The weight percent of the carbon additive in the intercalation electrode may be any of the following values or in a range of any two of the following values: 3, 4, 5, 6, 7, 8, 9, and 10 weight percent. The weight percent of the polymeric binder in the intercalation electrode may be any of the following values or in a range of any two of the following values: 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35 weight percent. The polymeric binder may be polyvinylidene di-fluoride (PVDF).

The intercalation compound, carbon additive, and polymeric binder can be mixed to form a slurry in a solvent. The slurry can be applied to a substrate to form the intercalation electrode. The substrate may be formed of metal, carbon cloth, or graphene sheets. The application process may include blade-casting, roll casting, and/or airbrushing.

The formed first and second cation intercalation electrodes 458 and 460 are sandwiched with anion exchange membrane 456 to form a membrane electrode assembly (MEA). The MEA may be a self-standing structure. The MEA is placed between first and second flow plates 452 and 454, thereby producing IDI cell 450. Individual IDI cells 450 may be stacked in parallel or series depending on the application to form an IDI module. Each of first and second flow plates 452 and 454 may be formed of a metallic material or a graphite material. First flow channel 462 is formed between the outer surface of first cation intercalation electrode 458 and first flow plate 452. Second flow channel 464 is formed between the outer surface of second cation intercalation electrode 460 and second flow plate 454. First and second flow channels 462 and 464 are configured to direct first and second saline solution stream (e.g., seawater, brackish water, or hard water) throughout first and second cation intercalation electrodes 458 and 460, respectively.

Figure 9:
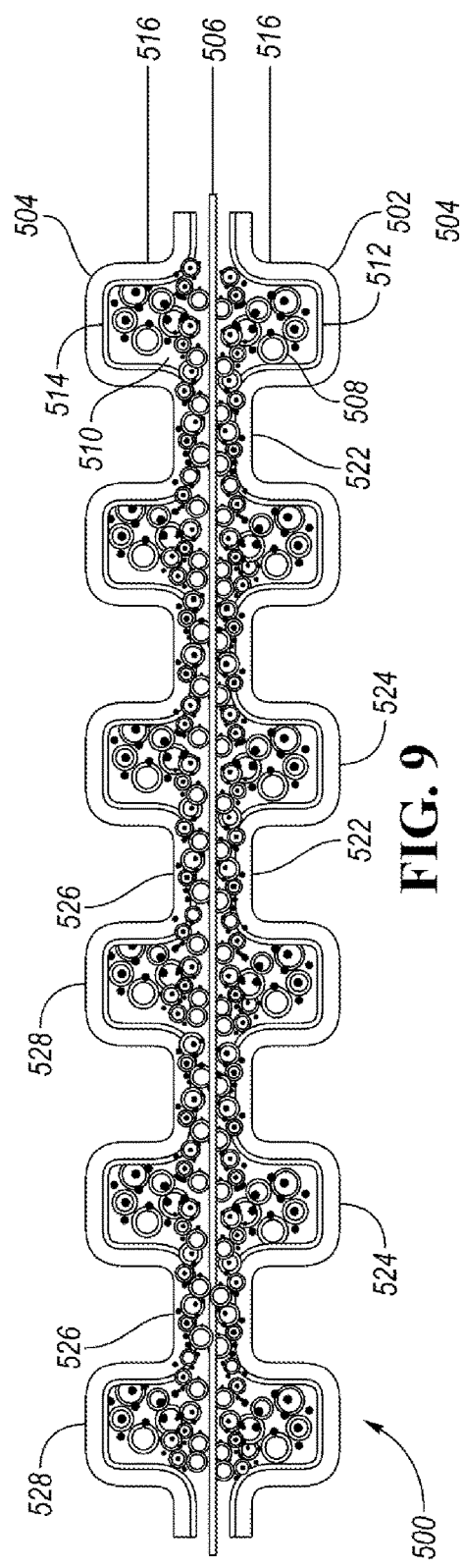
FIG. 9 is a cross section view of an IDI cell having flow plate channels at least partially defined by flow channel plates packed with intercalation material.

FIG. 9 depicts a cross section view of IDI cell 500. DI cell 500 includes first and second flow plates 502 and 504 and anion exchange membrane 506. First and second flow channels 508 and 510 are formed between first and second flow plates 502 and 504, respectively, and anion exchange membrane 506. As shown in FIG. 9, the inner surface of first and second flow channels 508 and 510 are coated with first and second coatings 512 and 514, respectively. One or more of the flow channels may be at least partially or entirely coated with a coating material. The coating material may be a carbon material, a metal oxide, a binary metal oxide, a ternary metal oxide, a metal nitride, a metal carbide, or a combination thereof. By at least partially coating the first and/or second inner surfaces of the flow channels, the flow plates may be made of a relatively lower cost material, such as a plastic material or a polymer material. In other embodiments, one or more of the flow plates may be made of a titanium-containing or graphite-containing material.

Figure 10:
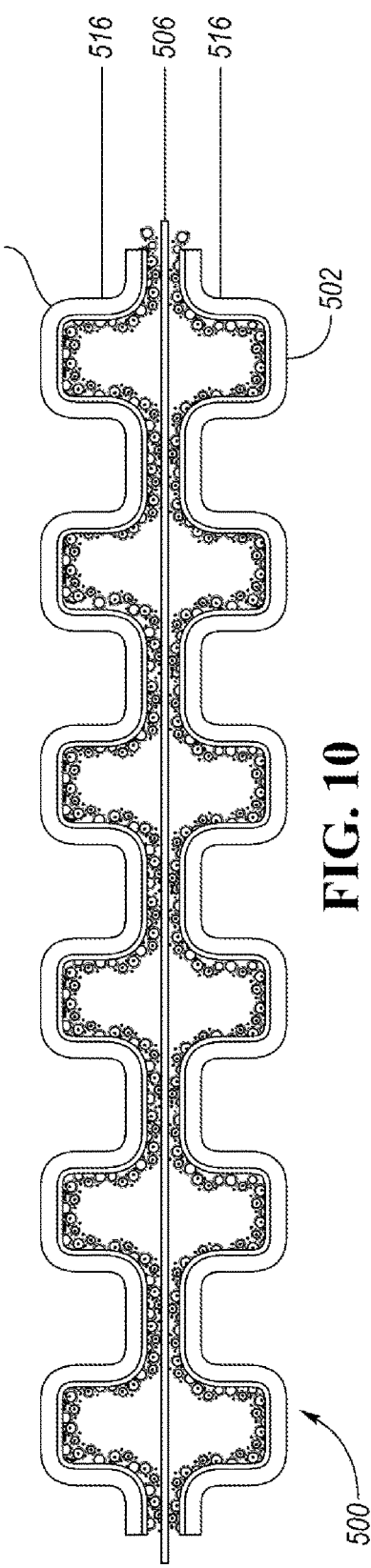
FIG. 10 is a cross section view of an IDI cell having intercalation material formed adjacent to the inner surface of flow plate channels.

As shown in FIG. 9, first and second flow channels 508 and 510 are at least partially filled with intercalation material 516. Intercalation material 516 includes an intercalation compound. Intercalation material 516 may also include a carbon additive. Intercalation material 516 may also include a polymeric binder. In one embodiment, one side of the anion exchange membrane includes an intercalation electrode such as electrode 458 or 460 and the other side of the anion exchange membrane does not include such an electrode but rather includes a flow channel at least partially filled with intercalation material 516 (e.g., as shown in FIG. 9 or 10). First and/or second flow channels 508 and/or 510 may be partially filled with intercalation material 516 such that a packing volume of first and/or second flow channel 508 and/or 510 is occupied by intercalation material 516. The packing volume may be any of the following values or in a range of any two of the following values: 40, 45, 50, 55, 60, 65, 70, 75, and 80 percent by volume. The porosity of intercalation material 516 within first and/or second flow channels 508 and/or 510 may be any of the following values or in a range of any two of the following values: 20, 25, 30, 35, 40, 45, 50, 55, and 60%. In one or more embodiments, the porosity of the intercalation material in one channel may be different than the porosity of the intercalation material in the other channel. The packed volume maintains porosity for water transport through first and/or second flow channels 508 and/or 510.

First flow plate 502 includes first land regions 522 adjacent to anion exchange membrane 506 and first channel regions 524 spaced apart from anion exchange membrane 506. Second flow plate 504 includes second land regions 526 adjacent to anion exchange membrane 506 and second channel regions 528 spaced apart from anion exchange membrane 506.

As shown in FIG. 9, intercalation material 516 is substantially evenly distributed throughout the volume of first and second flow channels 508 and 510. In this embodiment, intercalation material 516 is positioned in a first region between anion exchange membrane 506 and first land regions 522 and/or second land regions 526 and is also positioned within a second region extending away from anion exchange membrane 506 and first and second channel regions 524 and/or 528. In one or more embodiments, the first region has a greater packing volume than the second region.

In another embodiment, as shown in FIG. 10, intercalation material 516 may be positioned as a layer formed on the inner surface of first and second flow plates 502 and 504. Intercalation material 516 as shown in FIG. 10 may have the packing volume and/or porosity as described in connection with FIG. 9. In one embodiment, the layer is continuous along the entire inner surface of first and/or second flow plates 502 and 504. In another embodiment, the layer is discontinuous in that the layer only forms on the land and channel regions. In either of these embodiments, the porosity of the layer adjacent to the land regions may be higher than the porosity in the channel regions to improve electrode utilization via augmented ionic transport. In certain embodiments, the layer in the land regions may be thicker than the layer in the channel region, or vice versa, to improve overall utilization of the active material. The thickness of the layer may be any of the following values or in a range of any two of the following values: 10, 20, 30, 40, 50, 60, 70, 80, 90, and 100 nanometers. The relatively thicker thickness may be any of the following values or in a range of any two of the following values: 50, 55, 60, 70, 80, 90, and 100 nanometers. The relatively thinner thickness may be any of the following values or in a range of any two of the following values: 10, 20, 30, 40, 45, and 50 nanometers.

Flow channels 508 and/or 510 may also include a high surface area carrier material. Non-limiting examples of high surface area carrier material include wicking fibers, carbon fibers, polymeric materials, and combinations thereof. In one or more embodiments, the high surface area carrier material is interspersed with intercalation material 516. In one or more embodiments, the high surface area carrier material can be applied to one or more surfaces of the anion exchange membrane 506 and at least a portion of the inner surface of one or more flow plates configured to receive intercalation material 516.

In one or more embodiments, a pore former material may be used to manufacture the IDI cells depicted in FIGS. 9 and 10. Non-limiting examples of pore former materials include alkali salts, sublimation materials (e.g., camphor), and combinations thereof. The pore former material may be mixed with an electrode ink (e.g., intercalation material in an ink form) and coated or sprayed onto a flow plate. Once the electrode ink is applied to the inner surfaces of the flow plate, the pore former material may be removed by dissolving the material into a solvent. Non-limiting examples of solvents include NaCl, EtOH, isopropyl alcohol, n-methylpyrrolidone, and mixtures thereof. In another embodiment, the pore former material may be removed by a mild heat treatment of a mild heat treatment material at a mild heat treatment temperature. The mild heat treatment material may be a camphor (terpenoid) polymer. The mild heat treatment temperature may be any of the following temperatures or in a range of any two of the following temperatures: 60, 65, 70, 75, 80, 85, 90, 95, and 100° C.

Through use of intercalation material areal packing in one or more flow channels according to one or more embodiments, the productivity (e.g., the amount of fresh water produced over unit time and/or the salt removal capacity) of the IDI module may be increased and/or the cost and size of the DI module may be decreased.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A device for removing ions from a solution, the device comprising:
    first and second flow plates, the first flow plate having first land regions and first channel regions spaced apart from the first land regions, and the second flow plate having second land regions and second channel regions spaced apart from the second land regions;
    an anion exchange membrane positioned between the first and second flow plates to form first and second flow channels between the anion exchange membrane and the first and second flow plates, respectively, the first flow channel having a first land volume positioned between the first land regions and the anion exchange membrane, the first flow channel having a first channel volume positioned between the anion exchange membrane and the first channel regions and spaced apart from the anion exchange membrane, the second flow channel having a second land volume positioned between the second land regions and the anion exchange membrane, and the second flow channel having a second channel volume positioned between the anion exchange membrane and the second channel regions and spaced apart from the anion exchange membrane; and an intercalation material layer positioned within the first land and channel volumes and the second land and channel volumes, a first thickness of the intercalation material layer within the first land volume is greater than a second thickness of the intercalation material layer in the first channel volume.

2. The device of claim 1, wherein the first thickness is 55 to 100 nanometers and the second thickness is 10 to 50 nanometers.

3. The device of claim 1, wherein the intercalation material layer has a packing volume of 40 to 80% the total volume of the volume of the first or second flow channel.

4. The device of claim 1, wherein the intercalation material layer has a porosity in a range of 20 to 60%.

5. The device of claim 1, wherein the first flow plate includes a first inner surface facing the anion exchange membrane, the second flow plate includes a second inner surface facing the anion exchange membrane, and the first and/or second inner surface includes a coating layer.

6. The device of claim 5, wherein the coating layer is formed of a carbon material.

7. The device of claim 6, wherein the first and/or second flow plate is formed of a polymer material.

8. A device for removing ions from a solution, the device comprising:
 first and second flow plates, the first flow plate having first land regions and first channel regions spaced apart from the first land regions, and the second flow plate having second land regions and second channel regions spaced apart from the second land regions;
 an anion exchange membrane positioned between the first and second flow plates to form first and second flow channels between the anion exchange membrane and the first and second flow plates, respectively, the first flow channel having a first land volume positioned between the first land regions and the anion exchange membrane, the first flow channel having a first channel volume positioned between the anion exchange membrane and the first channel regions and spaced apart from the anion exchange membrane, the second flow channel having a second land volume positioned between the second land regions and the anion exchange membrane, and the second flow channel having a second channel volume positioned between the anion exchange membrane and the second channel regions and spaced apart from the anion exchange membrane; and
 an intercalation material layer positioned within the first land and channel volumes and the second land and channel volumes, a first porosity of the intercalation material layer within the first land volume is greater than a second porosity of the intercalation material layer in the first channel volume.

9. The device of claim 8, wherein the intercalation material layer is continuous between a portion of the first land and channel volumes.

10. The device of claim 8, wherein the intercalation material layer is discontinuous between a portion of the first land and channel volumes.

11. The device of claim 8, wherein the first porosity is 40 to 60% and the second porosity is 20 to 40%.

12. The device of claim 1, wherein the intercalation material layer is continuous between a portion of the first land and channel volumes.

13. The device of claim 1, wherein the intercalation material layer is discontinuous between a portion of the first land and channel volumes.

\* \* \* \* \*